United States Patent [19]

Peitsmeier et al.

[11] 4,229,062
[45] Oct. 21, 1980

[54] IGNITION LOCK UNIT WITH ANTI-THEFT PROTECTION

[75] Inventors: Karl Peitsmeier, Neuhausen; Manfred Link, Waiblingen, both of Fed. Rep. of Germany

[73] Assignee: Daimler-Benz Aktiengesellschaft, Neuhausen, Fed. Rep. of Germany

[21] Appl. No.: 8,583

[22] Filed: Feb. 1, 1979

[30] Foreign Application Priority Data

Feb. 3, 1978 [DE] Fed. Rep. of Germany ....... 2804614

[51] Int. Cl.³ ............................................. H01R 13/44
[52] U.S. Cl. .......................................... 339/82; 339/10
[58] Field of Search ...................... 339/82, 10; 70/363, 70/229, 232; 403/252; 200/11 C, 44

[56] References Cited

U.S. PATENT DOCUMENTS

| | | | |
|---|---|---|---|
| 2,033,252 | 3/1936 | Parker | 200/11 C |
| 2,663,780 | 12/1953 | Hept et al. | 200/44 |
| 3,753,361 | 8/1973 | Schiesteri | 70/185 |
| 3,990,276 | 11/1976 | Schontz | 403/252 |

FOREIGN PATENT DOCUMENTS 1260322  1/1972  United Kingdom ...................... 70/363

Primary Examiner—John McQuade
Attorney, Agent, or Firm—Craig and Antonelli

[57] ABSTRACT

An ignition lock unit with a disassembly which can be cancelled only by means of an associated key rotated into a predetermined position and with a coupling connected to cable ends which is adapted to be mounted over the coordinated contact pins of the ignition starter switch part of the ignition lock unit. The coupling includes a contact carrier plate with a centrally arranged aperture for a locking rod extending out of the ignition starter switch, whereby the latter during the assembly and disassembly of the coupling, passes through this aperture when a corresponding position is reached by means of the key. In every other position of the key or with a removed key, the free end of the locking rod engages the aperture hook-shaped from behind.

5 Claims, 3 Drawing Figures

IGNITION LOCK UNIT WITH ANTI-THEFT PROTECTION

The present invention relates to an ignition lock unit with a disassembly protection which can be cancelled or rendered inoperable only by means of an associated key rotated into a predetermined position and with a coupling connected to cable ends, which is adapted to be mounted over the coordinated contact pins of the ignition lock switch part of the ignition lock unit.

A disassembly protection for a lock part of an ignition lock unit which is received by a mounting means fixed at the vehicle and which is adapted to be locked together with the steering spindle is disclosed in the German Offenlegungsschrift No. 16 80 023 and corresponding U.S. Pat. No. 3,753,361. A pin adapted to be pressed-in in the locking position thereby prevents a pulling-out of the lock part out of the mounting means. Since the pin must be easily reachable in case of repair, there exists also the possibility that the pin can be taken down by means of suitable tools in an unauthorized manner to such an extent that its locking action is lost.

It is the aim of the present invention to provide a possibility for connecting parts of an ignition lock unit, especially the ignition lock switch part with the ignition lock unit in such a manner that an unlawful disassembly is not possible even with the assistance of tools.

Consequently, an ignition lock unit of the aforementioned type is proposed, whereby according to the present invention the coupling includes a contact carrier plate with a centrally arranged aperture for a locking rod extending out of the ignition lock switch part, which passes through the aperture during the assembly or disassembly of the coupling, when a corresponding position is brought about by means of the key, and whereby in every other key position or with a pulled-out key, the free end of the inserted locking rod engages the aperture hook-shaped from behind.

The connection of the cable ends to the contact bushes can be realized in a simple manner if the contact carrier plate is adapted to be secured by means of snap-in connections at a housing surrounding the same and forming a part of the coupling.

An additional armoring of the connection can be attained in that the ignition lock switch part is surrounded by a sleeve adapted to be disassembled only with a removed or pulled-off coupling, which covers off both the separating surface between the ignition lock switch part and the coupling as also the snap-in connections thereof. It is thereby appropriate if, for purposes of fixing the sleeve at the ignition lock switch part, fastening means are provided which are arranged at the base of the guidances formed out of the sleeve and which are covered off with an emplaced coupling by outer areas of the coupling engaging into the guidances.

Accordingly, it is an object of the present invention to provide an ignition lock unit with a disassembly protection which avoids by simple means the aforementioned shortcomings and drawbacks encountered in the prior art.

Another object of the present invention resides in an ignition lock unit with an anti-theft protection arrangement which assures far-reachingly against unauthorized disassembly, even with the use of tools.

A further object of the present invention resides in an ignition lock unit of the type described above which provides a far-reaching anti-theft protection by simple structural means that can be readily assembled and disassembled for purposes of installation and repairs.

Still another object of the present invention resides in an ignition lock unit with a disassembly protection which is characterized by significant armoring of the connection of the various parts thereof, yet requires only relatively few parts that can be easily manufactured and assembled.

These and other objects, features and advantages of the present invention will become more apparent from the following description when taken in connection with the accompanying drawing which shows, for purposes of illustration only, one embodiment in accordance with the present invention, and wherein.

Figure 1:
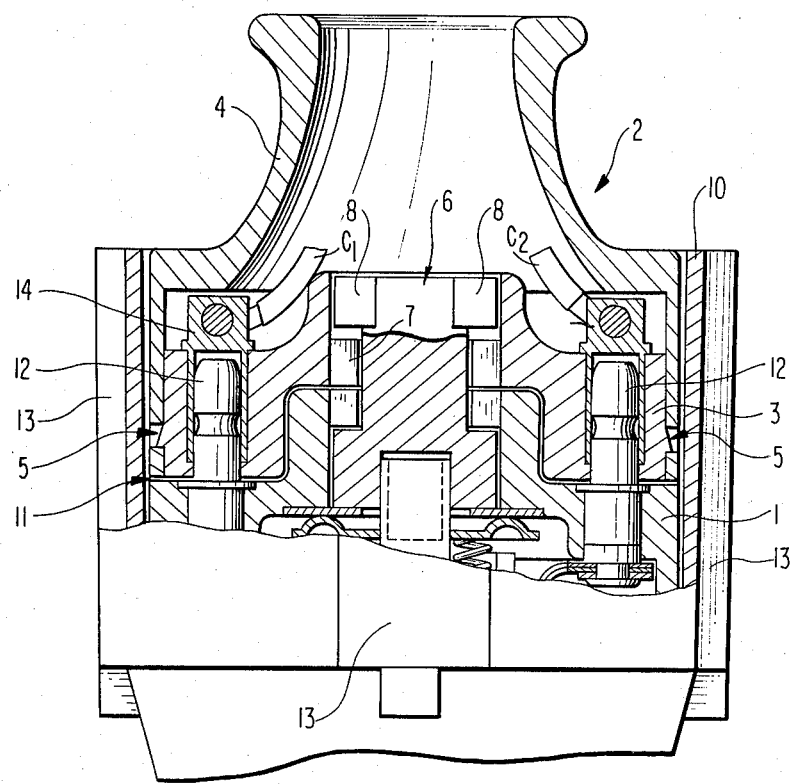
FIG. 1 is a cross-sectional view of an ignition lock switch with an installed coupling according to the present invention, whereby the ignition lock switch is shown only in part.

Referring now to the drawing wherein like reference numerals are used throughout the various views to designate like parts, reference numeral 1 designates an ignition lock switch part which is a component of an ignition lock unit otherwise not illustrated in detail. An installed coupling generally designated by reference numeral 2, which rests on the ignition lock switch part 1, essentially consists of a contact carrier plate 3 and of a housing 4 which are coupled with one another by means of snap-in connections generally designated by reference numeral 5 (FIG. 1). A centrally arranged locking rod generally designated by reference numeral 6 which is rotatable by the ignition key (not shown) extends out of the ignition lock switch part 1, passes through an aperture 7 of the contact carrier plate 3 and with its free end 8 engages the aperture 7 hook-shaped from behind when the ignition key is rotated from the assembly position for the locking rod 6 illustrated in FIG. 2, for example, into the parking position illustrated in FIG. 3.

A sleeve 10 emplaced or installed together with the ignition lock unit and from the top side of the ignition lock switch part 1 by means of screws 9. The sleeve 10 covers both the separating surface 11 between the ignition lock switch part 1 and the coupling 2 and also the snap-in connections 5, includes guidances 13 (FIG. 3) for the positionally correct insertion of the coupling 2 over the coordinated contact pins 12 of the ignition starter switch part 1.

Figure 2:
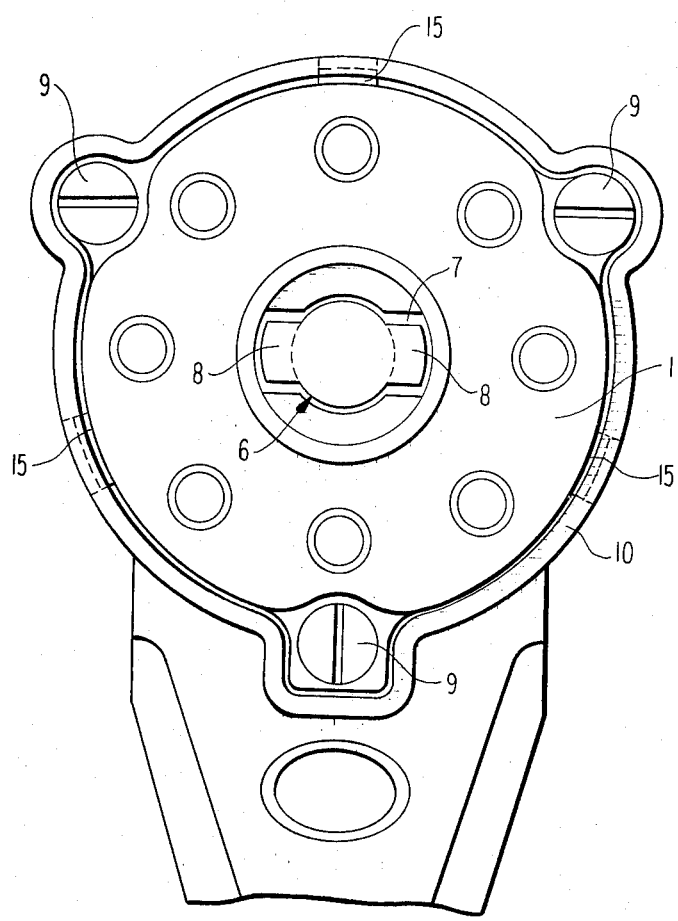
FIG. 2 is a plan view on the ignition lock switch part of the present invention with a removed or pulled-off coupling and with the locking rod thereof rotated into the assembly position.
Figure 3:
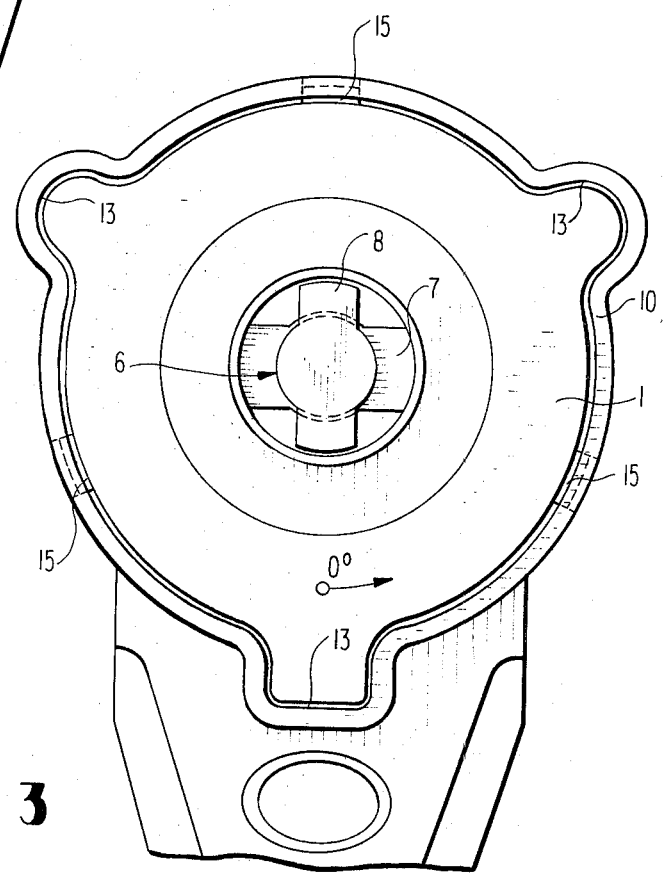
FIG. 3 is a plan view on the ignition lock switch part of the present invention with a rotated locking rod and with the coupling not removed.

As shown in FIG. 1, cables $C_1$, $C_2$, are, prior to assembly, connected to the contact bushes 14 cast into the contact carrier plate 3. The cables $C_1$, $C_2$, extend out of the coupling 2 after the assembly through the spout-like end thereof. The thus-preassembled coupling 2 is then emplaced or installed with a corresponding key position, whereby the locking rod 6 then extends through the aperture 7 in the manner already described. In order that the contact carrier plate 3 cannot become loose during the driving operation and in order that the free end 8 of the locking rod 6 rotates always with a spacing above the aperture 7, a locking together with the sleeve 10 takes place in the emplaced position of the contact carrier plate 3 by snap-in connections 15 of any known suitable type and not illustrated in detail herein (FIGS. 2 and 3).

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An ignition lock unit with a disassembly protection that can be rendered inoperable only by means of an associated key rotated into a predetermined position, the ignition lock unit comprising an ignition lock switch part provided with contact pins, a locking rod means extending out of the ignition lock switch part, the locking rod means being rotatable by the key, coupling means connected to cable ends and adapted to be mounted over the contact pins of the ignition lock switch part, characterized in that the coupling means includes a contact carrier plate means having a centrally arranged aperture for accommodating the locking rod means, said locking rod means passing through the aperture when the coupling means are assembled, and in that means are provided at a free end of the locking rod means for preventing a disassembly of the ignition lock unit other than when the key has been rotated into the predetermined position, said means at the free end of the locking rod means being adapted to hook behind the aperture when the key has been rotated to any position other than said predetermined position or when the key is removed from the ignition lock unit thereby preventing a disassembly of the ignition lock unit.

2. An ignition lock unit according to claim 1, including a housing means surrounding the contact carrier plate means, characterized in that the housing means forms a part of the coupling means, and in that snap-in connection means are provided for securing the contact carrier plate means at the housing means.

3. An ignition lock unit according to claim 2, characterized in that a sleeve means surrounds the ignition lock switch part, said sleeve means being mounted in the ignition lock unit so as to be capable of being disassembled only with a removed coupling means, said sleeve means are adapted to cover separating surfaces between the ignition lock switch part and the coupling means and to cover the snap-in connection means.

4. An ignition lock unit according to claim 1, characterized in that a sleeve means surrounds the ignition lock switch part, said sleeve means being mounted in the ignition lock unit so as to be capable of being disassembled only with a removed coupling means, said sleeve means are adapted to cover separating surfaces between the ignition lock switch part and the coupling means.

5. An ignition lock according to one of claims 3 or 4, characterized in that guide means engageable with the coupling means are provided on said sleeve means for ensuring a correct mounting of the coupling means over the contact pins of the ignition lock switch part, fastening means are provided for fixing the sleeve means at the ignition lock switch part, said fastening means being arranged at a base of the guide means, and in that said fastening means are covered off by outer areas of the coupling means when the coupling means are installed in the ignition lock unit.

* * * * *